(12) United States Patent
DeMonte et al.

(10) Patent No.: US 11,499,880 B2
(45) Date of Patent: Nov. 15, 2022

(54) METHODS AND APPARATUS FOR PRESSURE-BASED DIRECT MEASUREMENT OF A FINAL CONTROL ELEMENT VARIABLE

(71) Applicant: Fisher Controls International LLC, Marshalltown, IA (US)

(72) Inventors: Joseph Frank DeMonte, Marshalltown, IA (US); William Sean Raymond, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 152 days.

(21) Appl. No.: 16/983,516

(22) Filed: Aug. 3, 2020

(65) Prior Publication Data
US 2022/0034735 A1 Feb. 3, 2022

(51) Int. Cl.
*G01L 3/00* (2006.01)
*G01L 3/10* (2006.01)
*G08B 21/18* (2006.01)

(52) U.S. Cl.
CPC .............. *G01L 3/108* (2013.01); *G08B 21/18* (2013.01)

(58) Field of Classification Search
CPC .................................. G01L 3/108; G08B 21/18
See application file for complete search history.

(56) References Cited

U.S. PATENT DOCUMENTS

| | | | |
|---|---|---|---|
| 9,915,375 B1 * | 3/2018 | Anderson | G05B 23/0235 |
| 11,231,349 B1 * | 1/2022 | Du | G01N 1/42 |
| 2019/0078299 A1 * | 3/2019 | Takenaka | E02F 9/225 |
| 2019/0263261 A1 * | 8/2019 | Ebertseder | B60T 13/588 |
| 2020/0116170 A1 * | 4/2020 | Schmidt | F16K 1/22 |
| 2020/0182377 A1 * | 6/2020 | Brown | F16K 31/042 |
| 2020/0317171 A1 * | 10/2020 | Lestage | B64C 25/42 |
| 2021/0301929 A1 * | 9/2021 | Wirth | F16K 37/0091 |

OTHER PUBLICATIONS https://www.google.com/search?q=torqie+measurment+based+on+pressure+signal&rlz=1C1GCEA_enUS792US793&oq=&aqs=chrome.0.69i59i450.956099j1j1&sourceid=chrome&ie=UTF-8.*

* cited by examiner

*Primary Examiner* — Max H Noori
(74) *Attorney, Agent, or Firm* — Hanley, Flight & Zimmerman, LLC

(57) ABSTRACT

Methods and apparatus for pressure-based direct measurement of a final control element variable are disclosed. An example method includes receiving a signal from a first sensor mounted on a shaft of a valve, converting the signal to a pressure, routing the pressure to a second sensor of a controller operatively coupled to a pneumatic actuator, the pneumatic actuator operatively coupled to the shaft, and determining, by the controller, a first torque on the shaft based on the pressure.

17 Claims, 4 Drawing Sheets

METHODS AND APPARATUS FOR PRESSURE-BASED DIRECT MEASUREMENT OF A FINAL CONTROL ELEMENT VARIABLE

FIELD OF THE DISCLOSURE

This disclosure relates generally to process control systems and, more particularly, to methods and apparatus for pressure-based direct measurement of a final control element variable.

BACKGROUND

Process control systems include instrumentation positioned throughout a plant to enable collection of data for purposes of monitoring and troubleshooting processes. Data collection can involve measurements made by sensors, including parameters such as pressure, flow rate, temperature, weight, density, velocity, etc. Operation of process control systems is dependent on process data provided by measurement instrumentation and control of the process by the operation of final control elements. Final control elements can include valves, pumps, process heaters, agitators, fans, and other equipment that can directly change a process.

SUMMARY

An example method includes receiving a signal from a first sensor mounted on a shaft of a valve, converting the signal to a pressure, routing the pressure to a second sensor of a controller operatively coupled to a pneumatic actuator, the pneumatic actuator operatively coupled to the shaft, and determining, by the controller, a first torque on the shaft based on the pressure.

An example apparatus includes a converter to receive a signal from a first sensor mounted on a shaft of a valve, convert the signal to a pressure, and route the pressure to a second sensor, and a controller to receive the pressure from the second sensor, and determine a first torque on the shaft based on the pressure, wherein the controller is operatively coupled to a pneumatic actuator, the pneumatic actuator operatively coupled to the shaft.

An example non-transitory computer readable storage medium including instructions that, when executed, cause a machine to at least receive a first pressure, the first pressure converted from a signal from a first sensor mounted on a shaft of a valve, determine a first torque on the shaft based on the first pressure, receive a second pressure, the second pressure provided to a pneumatic actuator operatively coupled to the valve, and determine a second torque on the shaft based on the second pressure.

DETAILED DESCRIPTION

Figure 1:
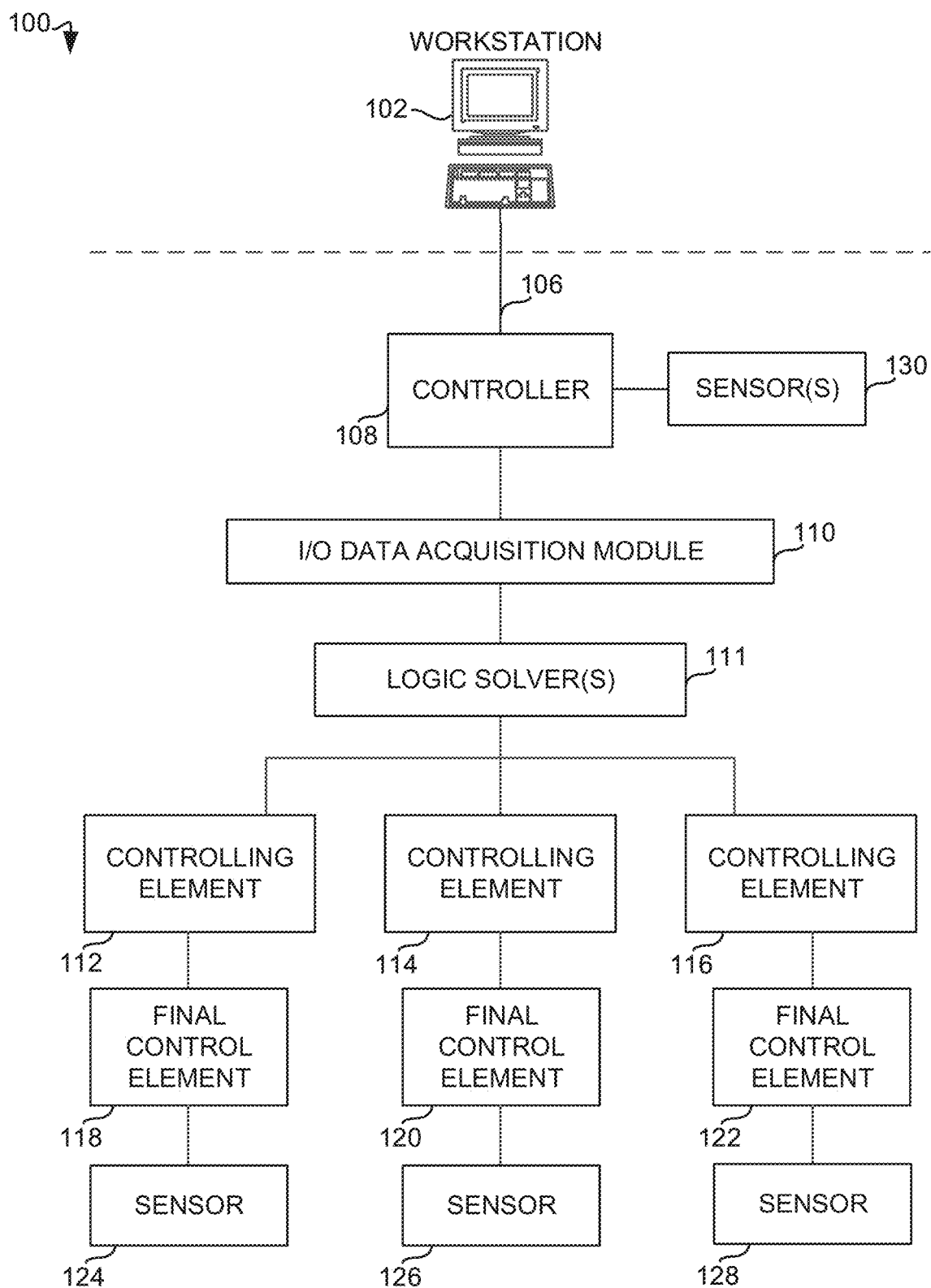
FIG. 1 is a diagram of an example process control system within which the teachings of this disclosure may be implemented.

Process control systems include one or more process controllers communicatively coupled to an operator workstation and one or more process control and instrumentation devices (e.g., field devices). Field devices can include valves, switches, and sensors to perform functions within the process, including opening and/or closing valves, measuring process control parameters, etc. The process controller receives information regarding process measurements or process variables associated with the field devices, using the information to implement control routines and/or generate control signals to control the process operation. For example, a control valve (e.g., a pneumatic control valve, an electric control valve, a hydraulic control valve, etc.) receives a signal (e.g., process variable) measured using process control sensors and/or transducers (e.g., temperature, pressure, flow, etc.). The controller compares the process variable to a desired value of the process variable (e.g., a setpoint) and initiates a control action that results in a final control element (e.g., a valve via an actuator) initiating a change in the process to return the process variable to the setpoint. However, not all measurements performed in the process control system are direct. For example, a torque measurement on a valve shaft is typically performed indirectly using pressure versus travel force calculations (e.g., using a moment arm) based on a pressure provided to an actuator and a corresponding specification data sheet that provides a typical relationship between pressure and force for the actuator. As such, this measurement is indirect and approximate given that it is not a true mechanical torque but, rather, an inferred value (e.g., based on a relation of pressure measurements to a theoretical torque value). Improved measurement accuracies can be obtained using direct measurements and/or a combination of a direct measurement with an indirect measurement to capture process control system-related measurements under varying conditions (e.g., responding accurately to fast-changing torque conditions, etc.).

Examples disclosed herein describe methods and apparatus for pressure-based direct measurement of a final control element variable. Particular examples disclosed herein utilize one or more sensors that mount directly to a rotary valve shaft and output a voltage or current. In the examples disclosed herein, the voltage or current output by the sensor(s) can be converted to a pressure signal utilizing voltage-to-pressure (V/P) or current-to-pressure (I/P) converters. The pressure signal generated by the converter can then be routed to an unused pressure sensor integral to or otherwise operatively coupled to an instrument controller. Based on this pressure input signal, the instrument controller can detect changes in pressure and/or perform calculations to compare direct and indirect measurements (e.g., a torque measurement) using associated software. While the examples disclosed herein focus on the measurement of shaft torque in a rotary valve using a strain gauge, any other external sensors (e.g., temperature sensors, acoustic emission sensors, etc.) can be used to obtain direct measurements via the voltage-to-pressure (V/P) or current-to-pressure (I/P) converters. The examples disclosed herein also enable the process control system instrument controller to read both a direct measurement and an indirect measurement rather than requiring two separate devices and/or multiple tools for each type of measurement.

FIG. 1 is a diagram of an example process control system 100 within which the teachings of this disclosure may be implemented. The process control system 100 includes an example workstation 102, an example controller 108, an example data acquisition module 110, example logic solver(s) 111, example controlling element(s) 112, 114, 116, example final control element(s) 118, 120, 122, and/or example sensor(s) 124, 126, 128, 130.

The workstation 102 is communicatively coupled to the controller 108 via a bus or local area network (LAN) 106, which is commonly referred to as an Area Control Network (ACN). The LAN 106 may be implemented using any desired communication medium and protocol. For example, the LAN 106 may be based on a hardware or wireless Ethernet communication protocol. However, any other suitable wired or wireless communication medium and protocol could be used. The workstation 102 may be configured to perform operations associated with one or more information technology applications, user-interactive applications, and/or communication applications. For example, the workstation 102 may be configured to perform operations associated with process control-related applications and communication applications that enable the workstation 102 and the controller 108 to communicate with other devices or systems using any desired communication media (e.g., wireless, hardwired, etc.) and protocols (e.g., HTTP, SOAP, etc.).

The controller 108 may be configured to perform one or more process control routines and/or functions operating as one or more control loops that have been generated by a system engineer or other system operator using, for example, the workstation 102 or any other workstation and which have been downloaded to and instantiated in the controller 108. The controller 108 of the example process control system 100 of FIG. 1 is communicatively coupled to the Input/Output (I/O) data acquisition module 110. The data acquisition module 110 may be communicatively coupled to I/O cards (not shown in FIG. 1). The I/O cards may be communicatively coupled to the controlling element(s) 112, 114, 116, the final control element(s) 118, 120, 122, and/or the sensor(s) 124, 126, 128, 130. The controller 108 receives input signals from the I/O data acquisition module 110 and processes those input signals through the one or more control loops (not shown in FIG. 1) operating within the controller 108. In a process control loop, a process variable (e.g., pressure) is controlled or maintained based on a setpoint or established reference value. In the example process control system 100 of FIG. 1, a process control variable such as pressure is measured using one or more sensors (e.g., the sensors 124, 126, 128, 130) or transducers. A signal measured by the sensors is output and sent to the controller 108 via the I/O data acquisition module 110. An error detector (not shown in FIG. 1, in the controller 108) compares the process variable (e.g., a pressure value) to an established reference value (e.g., a setpoint). Based on the error signal determined by the controller 108, a control action is initiated by the controller 108 to alter the process until the process variable (e.g., pressure) converges to the desired setpoint value.

The I/O data acquisition module 110 of the example process control system 100 of FIG. 1 receives input signals that have propagated through the process control system 100 originating from the controlling element(s) 112, 114, 116 and/or the final control element(s) 118, 120, and 122. The input signals may include analog input data signals, discrete input data signals, and/or digital I/O data signals. For example, after receiving input signals from the controlling element(s) 112, 114, 116, the I/O data acquisition module 110 determines which input signals are to be forwarded to the controller 108. Alternatively, the I/O data acquisition module 110 may forward input signals to the controller 108 upon receiving a request from the controller 108. In some examples, the I/O data acquisition module 110 may receive varying amounts of input signals, output signals, messages and other types of communications. By managing which input signals are forwarded to the controller 108, the data acquisition module 110 can improve network efficiency within the process control system 100. The data acquisition module 110 also receives output signals originating from the controller 108, which the data acquisition module 110 may forward to the respective controlling element(s) 112, 114, 116.

The logic solver(s) 111 can be used to evaluate any inputs from the controlling element(s) 112, 114, 116, the final control element(s) 118, 120, 122, and/or the sensor(s) 124, 126, 128, 130 to determine presence of potentially hazardous conditions. For example, the logic solver(s) 111 can include multiple processors executing logic in parallel to ensure integrity of logic and resulting actions in the process control system, as part of many layers of protection present in a process control system to safeguard the process, equipment, personnel, etc. during operation.

The controlling element(s) 112, 114, 116 include any devices that are involved in the operation of final control element(s) 118, 120, 122 (e.g., valves, dampers, pumps, etc.). For example, controlling element(s) 112, 114, 116 can include actuators (e.g., pneumatic actuators, hydraulic actuators, electro-hydraulic actuators, solenoids, electric motors, etc.). For example, a pneumatic actuator positions a control valve by transmitting its motion and force through a stem that is operatively (e.g., mechanically coupled) to a stem or shaft of the control valve. As such, the actuator can move and hold the valve in a range of positions (e.g., from fully open to fully closed).

The final control element(s) 118, 120, 122 include any control elements that physically change a process in response to a change in the control system setpoint. For example, final control elements can include valves, dampers, fluid couplings, and/or gates. For example, a valve can control fluid flow through a pipe. The valve (e.g., final control element(s) 118, 120, 122) can include any type of process control valve.

The sensor(s) 124, 126, 128, 130 can be any sensors used to monitor process control variables (e.g., temperature, pressure, flow, etc.). For example, a valve (e.g., final control element(s) 118, 120, 122) can include a sensor (e.g., sensor(s) 124, 126, 128). The sensors send input signals to the I/O data acquisition module 110. In some examples, the sensors may send the input signals in response to a request from the I/O data acquisition module 110. The controller 108 receives the input signals and processes the signals via one or more control loops. The control loops use the input signals to determine appropriate control actions for the signal. The controller 108 then transmits the control actions via an output signal to the actuator and/or valve to cause appropriate changes in the fluid flow. In the example of FIG. 1, the sensor(s) 130 communicate directly with the controller 108, such that the sensor(s) 130 monitor a value related to the process control loop set point. For example, the sensor(s) 130 can act as primary sensors to allow for process control loop-wide control versus localized control of the final control element(s) 118, 120, 122 provided by the sensor(s) 124, 126, 128.

In the example of FIG. 1, the controlling element(s) 112, 114, 116, the final control element(s) 118, 120, 122, and/or the sensor(s) 124, 126, 128, 130 may be Fieldbus compliant valves, actuators, sensors, etc., such that communication occurs via a digital data bus using the Fieldbus communication protocol. The controlling element(s) 112, 114, 116, the final control element(s) 118, 120, 122, and/or the sensor(s) 124, 126, 128, 130 can also be Profibus, HART, or AS-i compliant devices that communicate via the data bus using the Profibus, AS-i and HART communication protocols. In some example implementations, the controlling element(s) 112, 114, 116, the final control element(s) 118, 120, 122, and/or the sensor(s) 124, 126, 128, 130 can communicate information using analog communications or discrete communications instead of digital communications.

Figure 2:
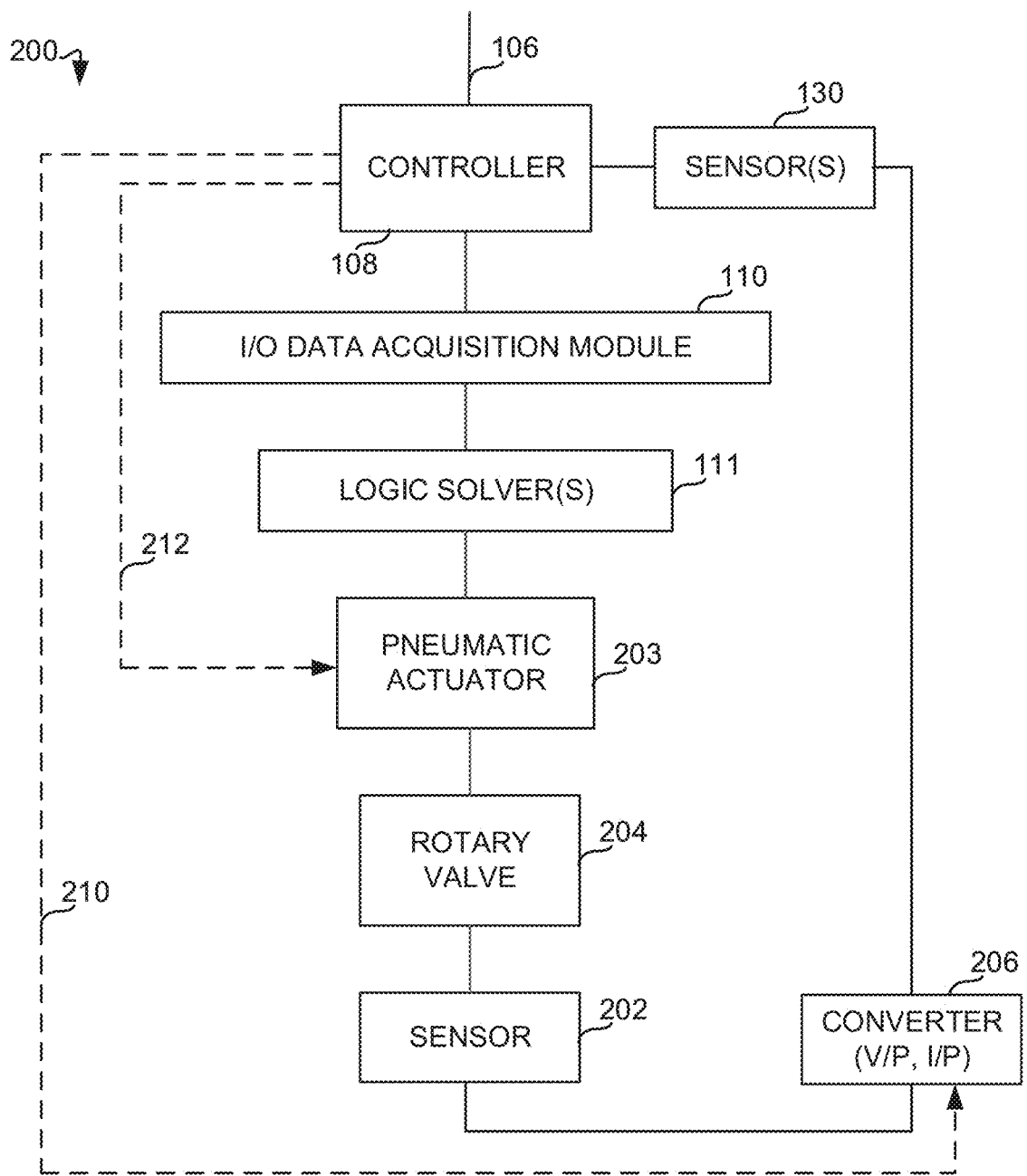
FIG. 2 is a block diagram illustrating an example process control system to determine a direct measurement of a final control element variable in accordance with the teachings of this disclosure.

FIG. 2 is a block diagram illustrating an example process control system 200 to determine a direct measurement of a final control element variable in accordance with the teachings of this disclosure. The process control system 200 includes the controller 108, the data acquisition module 110, the logic solver(s) 111, and the sensor(s) 130. The sensor(s) 130 are shown as a separate block but can be integral to the controller 108 or otherwise operatively coupled to the controller 108. The process control system 200 further includes an example sensor 202, a controlling element, which is a pneumatic actuator 203 in this example, a final control element, which is a rotary valve 204 in this example, and an example converter 206 (V/P, I/P, etc.). In the example of FIG. 2, the sensor 202 is a strain gauge. However, the sensor 202 can be any type of sensor producing a voltage, a current, or a resistance output (e.g., a pressure transducer, an acoustic emission sensor, a temperature sensor, a rotary position sensor, etc.). In the example of FIG. 2, the converter 206 is a voltage-to-pressure (V/P) converter or a current-to-pressure (I/P) converter. The converter 206 can receive a signal from the sensor 202. The converter 206 is supplied pressurized fluid (e.g., air) by an example supply pressure line 210 from the controller 108. In this example, the sensor 202 is mounted on a shaft of the rotary valve 204 and outputs a voltage and/or a current signal that is converted to a pressure signal via the converter 206. The sensor 202 can be positioned on any other final control element(s) 120, 122 requiring a torque-based measurement. In some examples, the shaft torque measurement can be used to determine how much force is required to fully open and/or close the rotary valve 204. The selection of a strain gauge for positioning on the shaft of a valve can be determined based on valve parameters (e.g., shaft diameter, material properties, etc.). For example, a strain gauge positioned on a valve shaft is distorted from torsional loading, with electrical resistance changes of the strain gauge corresponding to the torque on the shaft (e.g., torque occurring in the form of a torsional moment). The converter 206 can then route its pressure output (e.g., based on the voltage and/or current reading from the sensor 202) to the sensor(s) 130. In the example of FIG. 2, the sensor(s) 130 include one or more pressure sensors (e.g., a pressure sensor not being used by the controller 108 for other pressure-related measurements).

The controller 108 receives the pressure-based measurement via the sensor(s) 130 (e.g., pressure sensor(s)). More specifically, the pressure measurement received by the controller 108 corresponds directly to the strain and, thus, torque on the shaft of the rotary valve 204 measured by the sensor 202. In particular, the sensor 202 outputs a current or voltage that is directly related to strain and torque on the shaft, and the converter 206 outputs a pressure that is directly related to the current or voltage signal provided by the sensor 202. The controller calculates a direct torque (e.g., a first torque) acting on the sensor 202 and, thus, the shaft of the rotary valve 204 using the pressure(s) measured by the sensor(s) 130. In the example of FIG. 2, the controller 108 is coupled to the pneumatic actuator 203, which is operatively coupled to the rotary valve 204. As such, the controller 108 can also determine an indirect torque (e.g., a second torque) based on a pressure applied to the pneumatic actuator 203. As noted above, this second torque is an indirect torque measurement because the torque is determined in a conventional manner by relating a pressure applied to the pneumatic actuator 203 to a typical force and, in turn, a typical torque applied to the shaft of the rotary valve 204. In some examples, the controller 108 can compare the direct measurement (e.g., the first torque) to the indirect measurement (e.g., the second torque). In some examples, the logic solver(s) 111 can be used to determine deviations from permissible torque values as indicators of mechanical changes in the final control element (e.g., the rotary valve 204) based on the comparison of the direct and indirect torque measurements. In some examples, the direct and/or indirect measurements can be based on any other type of sensor 202 (e.g., a pressure transducer, an acoustic emission sensor, a temperature sensor, a rotary position sensor, etc.), material properties, required monitoring conditions, etc.

While an example manner of implementing the example process control system 100 of FIG. 1 is illustrated in FIG. 2, one or more of the elements, processes and/or devices illustrated in FIG. 2 may be combined, divided, re-arranged, omitted, eliminated and/or implemented in any other way. Further, the example controller 108, the example data acquisition module 110, the example logic solver(s) 111, the example controlling element 112 or pneumatic actuator 203, the example final control element 118 or rotary valve 204, the example sensor(s) 202, 130, the example converter 206, and/or, more generally, the example process control system 200 may be implemented by hardware, software, firmware and/or any combination of hardware, software and/or firmware. Thus, for example, any of the example controller 108, the example data acquisition module 110, the example logic solver(s) 111, the example controlling element 112 or pneumatic actuator 203, the example final control element 118 or rotary valve 203, the example sensor(s) 202, 130, the example converter 206, and/or, more generally, the example process control system 200 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example controller 108, the example data acquisition module 110, the example logic solver(s) 111, the example controlling element 112 or pneumatic actuator 203, the example final control element 118 or rotary valve 204, the example sensor(s) 202, 130, and the example converter 206 is/are hereby expressly defined to include a non-transitory computer readable storage device or storage disk such as a memory, a digital versatile disk (DVD), a compact disk (CD), a Blu-ray disk, etc. including the software and/or firmware. Further still, the example process control system 200 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
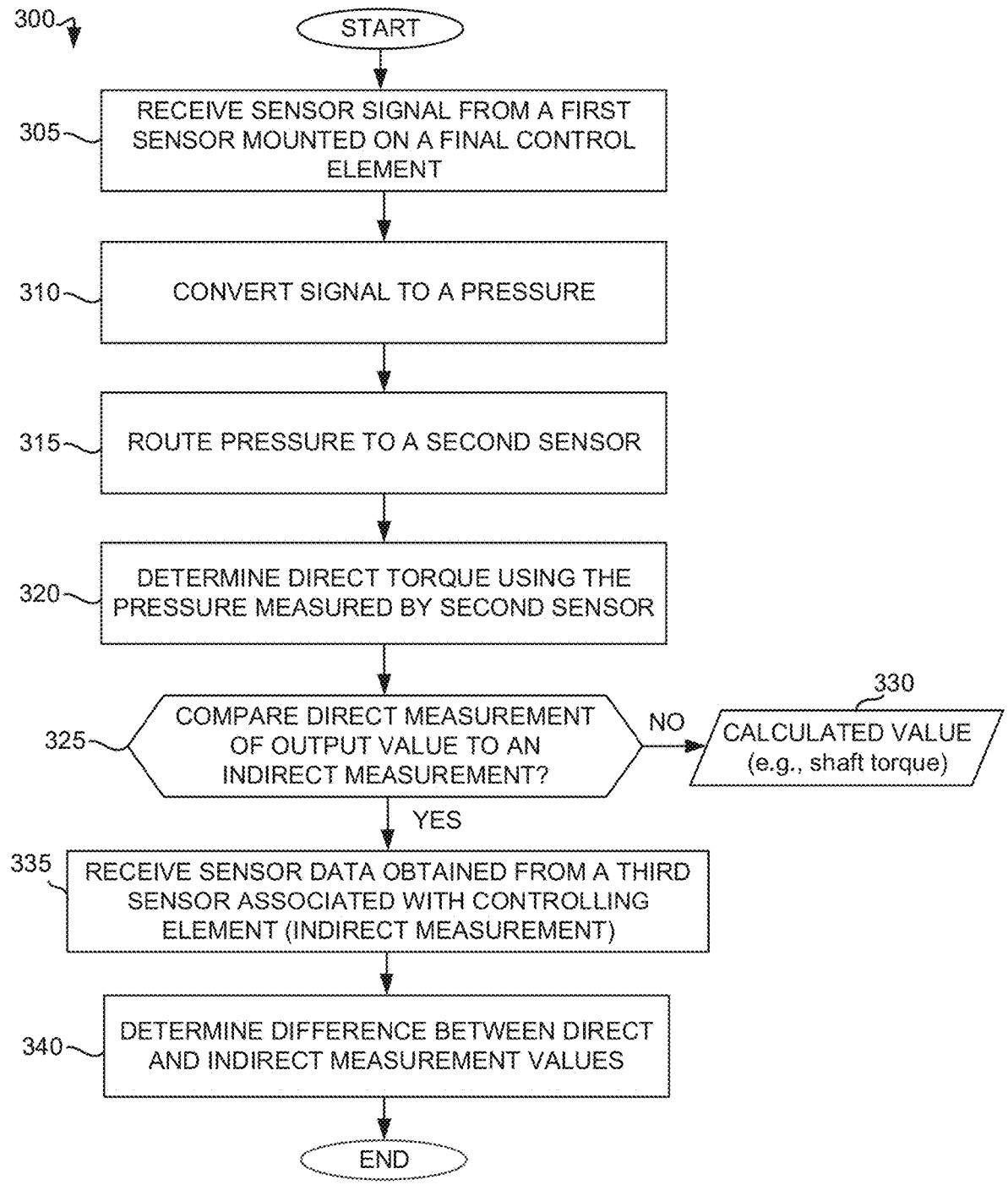
FIG. 3 is an example method to determine a direct measurement of a final control element variable using the process control system of FIG. 2.

A flowchart representative of example machine readable instructions for implementing the process control system 200 of FIG. 2 is shown in FIG. 3. The machine-readable instructions may be one or more executable programs or portion(s) of an executable program for execution by a processor such as the processor 406 shown in the example processor platform 400 discussed below in connection with FIG. 4. The program may be embodied in software stored on a non-transitory computer readable storage medium such as a CD-ROM, a floppy disk, a hard drive, a digital versatile disk (DVD), a Blu-ray disk, or a memory associated with the processor 406, but the entire program and/or parts thereof could alternatively be executed by a device other than the processor 406 and/or embodied in firmware or dedicated hardware. Further, although the example program is described with reference to the flowchart illustrated in FIG. 3, many other methods of implementing the example process control system 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIG. 3 may be implemented using executable instructions (e.g., computer and/or machine readable instructions) stored on a non-transitory computer and/or machine readable medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Now turning in detail to FIG. 3, an example method 300 to determine a direct measurement of a final control element variable (e.g., a torque applied to a shaft of the rotary valve 204) using the process control system 200 of FIG. 2 is illustrated. In the example of FIG. 3, the converter 206 of FIG. 2 receives a signal from a first sensor (e.g., the sensor 202, which may be a strain gauge, a temperature sensor, etc.) mounted on the final control element(s) 118, 120, 122 (e.g., mounted on the shaft of the rotary valve 204) (block 305). The converter 206 (e.g., a current-to-pressure converter, a voltage-to-pressure converter, etc.) converts the signal (e.g., a voltage, a current, a resistance, etc.) to a pressure (block 310). The converter 206 routes its output pressure measurement to a second sensor (e.g., the pressure sensor 130 of the controller 108, which is operatively coupled to the pneumatic actuator 203 and the shaft of the rotary valve 204) (block 315). The controller 108 determines a direct torque (e.g., a first torque) using the pressure as measured by the second sensor (block 320). As such, the first torque (e.g., a shaft torque) determined using the controller 108 is a direct measurement (e.g., based on torsional loading sensed at a rotary valve shaft using the sensor 202, which may be a strain gauge). In some examples, the controller 108 can compare this direct measurement to an indirect measurement (block 325) and/or output the calculated direct measurement torque value (e.g., the first torque) (block 330). If a comparison of direct and indirect torque measurements is desired, the controller 108 receives sensor data obtained from a third sensor (e.g., one of the sensors 130 or another sensor within the controller 108) associated with the controlling element 112 (e.g., the pneumatic actuator 203) (block 335). For example, the controller 108 can determine an indirect torque measurement on the rotary valve 204 based on a pressure applied to the pneumatic actuator 203 (e.g., measured using the third sensor). The controller 108 then determines a difference between the direct and indirect torque measurements (block 340).

Figure 4:
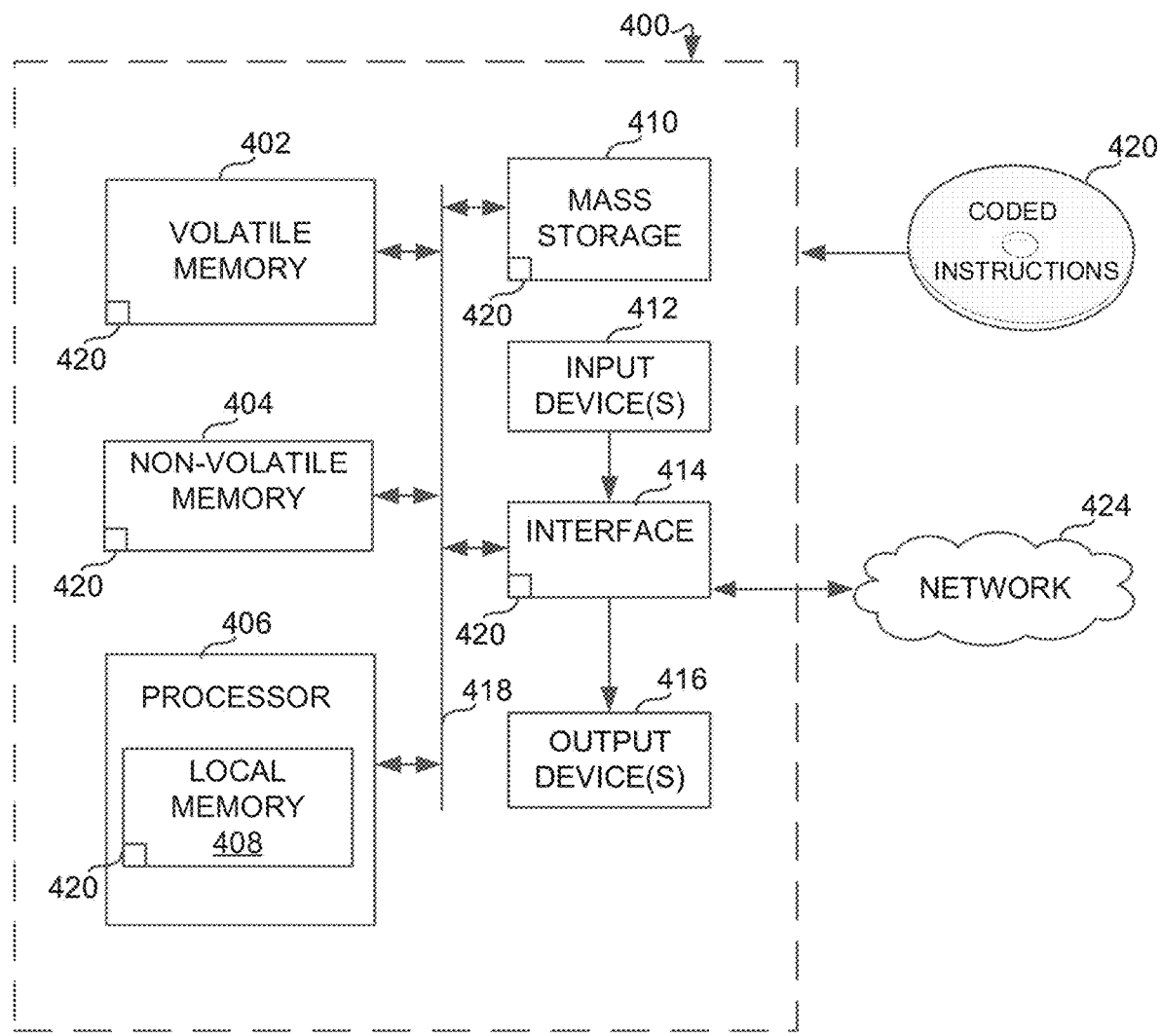
FIG. 4 is a schematic illustration of an example processor platform that may be used and/or programmed to carry out the example method of FIG. 3 and/or, more generally, to implement the example process control system of FIGS. 1 and 2.

FIG. 4 is a schematic illustration of an example processor platform 400 that may be used and/or programed to carry out the example method of FIG. 3 and/or, more generally, to implement the example process control system of FIGS. 1 and 2. The processor platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 400 of the illustrated example includes a processor 406. The processor 406 of the illustrated example is hardware. For example, the processor 406 can be implemented by one or more integrated circuits, logic circuits, microprocessors, GPUs, DSPs, or controllers from any desired family or manufacturer. The hardware processor may be a semiconductor based (e.g., silicon based) device.

The processor 406 of the illustrated example includes a local memory 408 (e.g., a cache). The processor 406 of the illustrated example is in communication with a main memory including a volatile memory 402 and a non-volatile memory 404 via a bus 418. The volatile memory 402 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 404 may be implemented by flash memory and/or any other desired type of memory device. Access to the main memory 402 and 404 is controlled by a memory controller.

The processor platform 400 of the illustrated example also includes an interface circuit 414. The interface circuit 414 may be implemented by any type of interface standard, such as an Ethernet interface, a universal serial bus (USB), a Bluetooth® interface, a near field communication (NFC) interface, and/or a PCI express interface.

In the illustrated example, one or more input devices 412 are connected to the interface circuit 414. The input device(s) 412 permit(s) a user to enter data and commands into the processor 406. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 416 are also connected to the interface circuit 414 of the illustrated example. The output devices 416 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 414 of the illustrated example, thus, typically includes a graphics driver card, a graphics driver chip or a graphics driver processor.

The interface circuit 414 of the illustrated example also includes a communication device such as a transmitter, a receiver, a transceiver, a modem, a residential gateway, a wireless access point, and/or network interface to facilitate exchange of data with external machines (e.g., computing devices of any kind) via a network 424. The communication can be via, for example, an Ethernet connection, a digital subscriber line (DSL) connection, a telephone line connection, a coaxial cable system, a satellite system, a line-of-site wireless system, a cellular telephone system, etc.

The processor platform 400 of the illustrated example also includes one or more mass storage devices 410 for storing software and/or data. Examples of such mass storage devices 410 include floppy disk drives, hard drive disks, compact disk drives, Blu-ray disk drives, redundant array of independent disks (RAID) systems, and digital versatile disk (DVD) drives.

The machine executable instructions 420 of FIG. 3 may be stored in the mass storage device 410, in the volatile memory 402, in the non-volatile memory 404, and/or on a removable non-transitory computer readable storage medium such as a CD or DVD.

From the foregoing, it will be appreciated that the methods and apparatus disclosed herein improve accuracy of measurements associated with control elements in a process control system. For example, methods and apparatus disclosed herein utilize sensors that mount directly to a rotary valve shaft and output a voltage or current. In the examples disclosed herein, the voltage or current output can be converted to pressure utilizing voltage-to-pressure (V/P) or current-to-pressure (I/P) converters. While the examples disclosed herein focus on the measurement of shaft torque in a rotary valve using a strain gauge, any other sensors (e.g., temperature sensor, acoustic emission sensor, etc.) can be used to obtain direct measurements via the voltage-to-pressure (V/P) or current-to-pressure (I/P) converters. The examples disclosed herein furthermore allow for the process control system instrument to read both a direct and indirect measurement rather than requiring two separate devices and/or multiple tools for each type of measurement.

Although certain example methods, apparatus and system have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
   receiving a signal from a first sensor mounted on a shaft of a valve;
   converting the signal to a pressure;
   routing the pressure to a second sensor of a controller operatively coupled to a pneumatic actuator, the pneumatic actuator operatively coupled to the shaft;
   determining, by the controller, a first torque on the shaft based on the pressure; and
   comparing the first torque to a second torque determined using a third sensor not mounted on the shaft.

2. The method of claim 1, wherein the first sensor is a strain gauge, a pressure transducer, an acoustic emission sensor, a temperature sensor, or a rotary position sensor.

3. The method of claim 1, wherein the second sensor is a pressure sensor.

4. The method of claim 1, wherein the signal is a voltage or a current.

5. The method of claim 1, wherein the valve is a rotary fluid valve.

6. The method of claim 1, wherein the second torque is determined based on a pressure applied to the pneumatic actuator via the controller.

7. An apparatus, comprising:
   a converter to:
      receive a signal from a first sensor mounted on a shaft of a valve;
      convert the signal to a pressure; and
      route the pressure to a second sensor; and
   a controller to:
      receive the pressure from the second sensor; and
      determine a first torque on the shaft based on the pressure,
      wherein the controller is operatively coupled to a pneumatic actuator, the pneumatic actuator operatively coupled to the shaft, the controller to compare the first torque to a second torque determined using a third sensor not mounted on the shaft.

8. The apparatus of claim 7, wherein the first sensor is a strain gauge, a pressure transducer, an acoustic emission sensor, a temperature sensor, or a rotary position sensor.

9. The apparatus of claim 7, wherein the second sensor is a pressure sensor.

10. The apparatus of claim 7, wherein the converter is a voltage-to-pressure converter or a current-to-pressure converter.

11. The apparatus of claim 7, wherein the signal is a voltage or a current.

12. The apparatus of claim 7, wherein the valve is a rotary fluid valve.

13. The apparatus of claim 7, wherein the controller is to determine the second torque based on a pressure applied to the pneumatic actuator.

14. A non-transitory computer readable storage medium comprising instructions that, when executed, cause a machine to at least:
   receive a first pressure, the first pressure converted from a signal from a first sensor mounted on a shaft of a valve;
   determine a first torque on the shaft based on the first pressure;
   receive a second pressure, the second pressure provided to a pneumatic actuator operatively coupled to the valve;
   determine a second torque on the shaft based on the second pressure; and
   compare the first torque to the second torque.

15. The computer readable storage medium of claim 14, wherein the instructions, when executed, further cause the machine to determine the second torque based on a pressure applied to the pneumatic actuator.

16. The computer readable storage medium of claim 14, wherein the instructions, when executed, further cause the machine to determine a deviation of the second torque from the first torque.

17. The computer readable storage medium of claim 16, wherein the instructions, when executed, further cause the machine to alert a user to the deviation.

* * * * *